United States Patent Office 3,264,178
Patented August 2, 1966

3,264,178
STERILIZING INSECTS WITH [BIS-(ETHYLENIMI-DO)PHOSPHORO]CARBAMATES
James B. Lesh, Flossmoor, and Charles W. Damaskus, La Grange, Ill., assignors to Armour Pharmaceutical Company, Chicago, Ill., a corporation of Delaware
No drawing. Filed July 26, 1963, Ser. No. 297,975
21 Claims. (Cl. 167—33)

This invention relates generally to insect control and more particularly to the control of insects through the topical and/or oral application to insects of certain substituted bis-ethylenimino phosphoro carbamates having the unexpected power to render the insects incapable of effective reproduction.

Compounds having an ethylenimino group disposed therein have heretofore been proposed for use as chemosterilants by La Breque of the U.S. Department of Agriculture. Some of his proposed compounds, upon screening, were found to offer promise; others did not.

The present invention is based upon our discovery that compounds containing two ethylenimino groups and having the general formula:

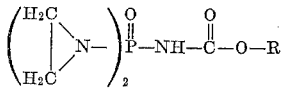

wherein R is selected from the group consisting of methyl, ethyl, benzyl and para- and meta-nitrobenzyl have a surprisingly unexpected power to render both male and female insects incapable of effective reproduction.

The preferred compounds for the practice of the present invention include:

Ethyl [bis-(ethylenimido)phosphoro] carbamate,
Methyl [bis-(ethylenimido)phosphoro] carbamate,
Benzyl [bis-(ethylenimido)phosphoro] carbamate,
Para-nitrobenzyl [bis-(ethylenimido)phosphoro] carbamate, and
Meta-nitrobenzyl [bis-(ethylenimido)phosphoro] carbamate.

The compounds employed in the practice of this invention can be prepared in a number of ways, for instance, they can be prepared by subjecting to pyrolysis a bis-(ethylenimido)phosphoryl carbamate to obtain the corresponding isocyanate. The reaction of this isocyanate by addition with an alcohol results in the formation of the corresponding carbamyl derivative.

As an alternative procedure, these compounds may be prepared by reacting phosphorus oxychloride (1 mole) and ethylenimine (2 moles) in the presence of a hydrogen chloride acceptor (2 moles), e.g. triethylamine and an inert solvent, e.g. dimethoxyethane, to obtain the corresponding bis-(ethylenimido)phosphoryl chloride. This chloride may then be treated with potassium cyanate to obtain the corresponding bis-(ethylenimido) or bis-(alkyl-ethylenimido)phosphoryl isocyanate. Then, the isocyanate may be reacted by addition with an alcohol to obtain the corresponding carbamyl compound.

In a preferred practice of preparing the substituted [bis(ethylenimido)phosphoro] carbamates, equivalent amounts of phosphorus pentachloride and a carbamate compound are reacted in an inert solvent, e.g. ethylene chloride, to obtain the corresponding dichlorophosphoryl isocyanate and then such isocyanate derivative is reacted with an equivalent amount of an alcohol or an amine to obtain the corresponding dichlorophosphoryl carbamyl or ureido compound. Finally, the latter compound is reacted with ethylenimine or a metal salt thereof in the presence of a hydrogen chloride acceptor, e.g. a tertiary amine such as triethylamine, and an inert solvent, e.g. toluene, to obtain the corresponding phosphoro carbamate.

It will be apparent that the compounds employed in the method of this invention contain radicals derived both from alkylating agents and compounds relating to urethane. The toxicity of these compounds has been determined.

We have also evaluated the effectiveness of these compounds in the chemosterilization of insects of various types and hereinafter report results obtained from engaging, both topically and orally with compounds of this invention, representative insects denoted *Cochliomyia hominivorax* (Coquerel) and *Musca domestica* L, popularly known as "screw worm flies" and "house flies," respectively.

The topical application is effected by disposing a compound of the invention in a suitable carrier and either dusting or spraying the mixture on the insect. Oral application is preferably achieved by admixing a compound of the invention in a suitably attractive food medium and feeding the admixture to the insects as by making the admixture available for eating by the insects.

To further aid in the understanding of the present invention, and not by way of limitation, the following examples are presented.

*Example I*

The following method may be employed for preparing dichlorophosphoryl isocyanate:

A suspension of 0.25 mole of phosphorus pentachloride in 150 cc. of ethylene chloride is cooled to a temperature of 7° C., and there is added to the cooled suspension a solution of 0.25 mole of ethyl carbamate in 100 cc. of ethylene chloride. The resulting mixture is slowly heated to reflux temperature, the rate of heating depending upon the rate at which hydrogen chloride and ethyl chloride are liberated in the consequent reaction. When the evolution of gas in the reaction mixture has been completed, i.e. after about 4½ hours, the resulting solution is concentrated under vacuum, and the residue thereupon formed is fractionated under reduced pressure. The yield of dichlorophosphoryl isocyanate is about 70% and the analysis of this compound is as follows:

Boiling point: 20–25° C. at 3 mm. of pressure or 37° C. at 8 mm. of pressure.
Spectrophotometric analysis: $N_D^{22}=1.466$.

*Example II*

Ethyl [bis-(ethylenimido)phosphoro]carbamate can be prepared by the following method:

A solution of 0.315 mole of absolute ethanol in 400 cc. of dry toluene is added over a period of 2½ hours into a stirred solution of 0.315 mole of the dichlorophosphoryl isocyanate obtained according to the method of Example I in 400 cc. of dry toluene. The reaction mixture is maintained at a temperature of about −10° C. during this addition procedure, and thereafter such reaction mixture is warmed slowly to room temperature. The reaction mixture is stirred for an additional one-half hour, and is then concentrated under vacuum to ca. 400 cc.

The concentrated solution is added over a period of about 2½ hours to a cold solution of 0.63 mole of triethylamine and 0.63 mole of ethylenimine in 400 cc. of toluene. The temperature of the reaction mixture is maintained at about 0–5° C. during this addition procedure. The reaction mixture is stirred in the cold for an additional 15 minutes, and is then warmed to room temperature.

The solid formed is separated from the reaction mixture by filtration. This separated solid is washed with toluene, and is then triturated with three 300 ml. portions of dry benzene. After separating undissolved material by filtration, the benzene solution is concentrated to dryness under reduced pressure. The yield of ethyl [bis-(ethylenimido)-phosphoro] carbamate is about 70%, and such product has a melting point of 88–90° C. An additional amount of the product may be obtained by evaporating the toluene solution to dryness, and then recrystallizing the resulting dry product from a benzene-petroleum ether mixture.

*Example III*

Methyl [bis-(ethylenimido)-phosphoro] carbamate can be prepared by the following method:

A solution of 0.15 mole of absolute methanol in 200 ml. dry toluene is added over a period of 1½ hours to a stirred solution of 0.15 mole of the dichlorophosphoryl isocyanate obtained according to the method of Example I in 200 ml. dry toluene. The reaction mixture is maintained at a temperature of about −10° C. during this addition procedure, and thereafter such a reaction mixture warmed slowly to room temperature. The reaction mixture is stirred for an additional ½ hour, and is then concentrated under vacuum to a volume of ca. 200 ml. The concentrated solution is added over a period of about 1½ hours to a cold solution of 0.3 mole of triethylamine and 0.3 mole of ethylenimine in 220 cc. dry benzene. The temperature of the reaction mixture is maintained at about 0° C. during this addition procedure. The reaction mixture is stirred in the cold for an additional 15 minutes and is then warmed to room temperature.

The solid thereupon formed is separated from the reaction mixture by filtration and washed with dry benzene. The filtrate and washings are combined and evaporated to dryness under reduced pressure. The yield of methyl [bis-(ethylenimido)-phosphoro] carbamate is about 76%, and such product has a melting point of 119–121° C.

*Example IV*

Benzyl [bis(ethylenimido)-phosphoro] carbamate can be prepared by the following method:

A mixture of 0.02 mole ethyl [bis-(ethylenimido)-phosphoro] carbamate obtained according to the method of Example II in 75 ml. dry toluene, and 0.02 mole benzyl alcohol is boiled for 5 minutes. The reaction mixture is immediately cooled, and then a small quantity of white solid is separated therefrom by filtration. The resulting filtrate is concentrated to dryness under vacuum. The residue thereupon obtained is recrystallized from a benzenecyclohexane mixture. The yield of benzyl-[bis-(ethylenimido)-phosphoro] carbamate is about 55%, and such product has a melting point of 134–135° C.

*Example V*

Para-nitrobenzyl [bis-(ethylenimido)-phosphoro] carbamate can be prepared by the following method:

About 800 ml. of dry toluene was transferred to a 1 liter three-neck flask and 100–150 ml. of toluene was distilled over in order to dry the apparatus. The temperature was then reduced to about 3–5° C. below the boiling point and 0.1 M (21.9 g.) ethyl [bis(ethylenimido)-phosphoro] carbamate, prepared by the method of Example II, and 0.11 M (18 g.) p-nitrobenzyl-alcohol was added. The solution obtained was heated to boiling for about 10 minutes, then the temperature was dropped to 5–10° C. below the boiling point and vacuum was cautiously applied until the boiling resumed. Boiling was continued under reduced pressure for 30 minutes, then the solution was allowed to cool to room temperature. At this point, a precipitate appeared which was separated by filtration. It was a polymeric substance, melting with decomposition at 220–230° C.

The filtrate was evaporated under reduced pressure to near dryness. The residue was washed with three 100 ml. portions of dry ether, then dried under reduced pressure for 1 hour. A light yellow colored solid was obtained which melted at 102–104° C.

This crude product was dissolved in dry toluene (40 ml./g.) at 50–55° C. To this, 12 g. of charcoal was added, with constant stirring, maintaining the temperature at about 50–55° C. for 20 minutes. After filtration, the resulting clear colorless solution was cooled at −20° C. overnight, whereafter the white crystalline precipitate formed upon cooling was separated by filtration. This material, after washing with ether and drying, had a melting point of 99–101° C. Further recrystallization raised the M.P. to 106–8° C. The pure compound gave an ethylenimine assay (by the thiosulfate method) corresponding to 104% of the calculated ethylenimine content. Elemental analysis: Calculated: C, 44.17; H, 4.60; N, 17.18; Found: C, 43.98; H, 4.91; N, 16.93.

*Example VI*

Meta-nitrobenzyl [bis-(ethylenimido)phosphoro] carbamate can be prepared by the following method:

About 800 ml. of dry toluene was transferred to a 1 liter three-neck flask and 100–150 ml. of toluene was distilled over to dry the apparatus of water. The temperature of the system was then reduced to about 3–5° C. below the boiling point and 0.1 M (21.9 gm.) ethyl [bis-(ethylenimido)phosphoro] carbamate, prepared by the method of Example II, and 0.11 M (18 gm.) m-nitrobenzyl alcohol was added. The solution obtained was heated to boiling for about 10 minutes, then the temperature was dropped to 5–10° C. below the boiling point and vacuum was cautiously applied until the boiling resumed. Boiling was continued under reduced pressure for 30 minutes, then the solution was allowed to cool to room temperature. At this point, a precipitate appeared which was separated by filtration. It was a polymeric substance, melting with decomposition at 220–230° C.

The filtrate was evaporated under reduced pressure to near dryness. The residue was washed with three 100 ml. portions of dry ether, then dried under reduced pressure for 1 hour. A light-yellow colored solid was obtained which melted at 102–104° C.

This crude product was dissolved in dry toluene (40 ml./g.) at 50–55° C. To this, 12 g. of charcoal was added, with constant stirring, maintaining the temperature at 50–55° C. for 20 minutes. After filtration, the resulting clear colorless solution was cooled at −20° C. overnight, whereafter the white crystalline precipitate formed upon cooling was separated by filtration. This material, after washing with ether and drying, had a melting point of 99–101° C. Further recrystallization raised the M.P. to 106–108° C. The pure compound gave an ethylenimine assay (by the thiosulfate method) corresponding to 104% of the calculated ethylenimine content. Elemental analysis: Calculated: C, 44.17; H, 4.60; N, 17.18; Found: C, 43.98; H, 4.91; N, 16.93.

*Example VII*

Adult Screw-worm flies, *Cochliomyia hominivorax* (Coquerel) of less than 24 hours old were treated both topically and orally with ethyl [bis-(ethylenimido)phosphoro] carbamate. The topical treatments were effected with a micrometer-controlled calibrated syringe. A 1% solution of the carbamate compound was prepared by mixing two microliters of the carbamate in a suitable pharmaceutical carrier, for example, aqueous Tween 20

(a complex mixture of polyoxyethylene ethers of mixed partial oleic esters of sorbitol anhydrides manufactured by Atlas Powder Company, a division of Atlas Chemical Industries, Inc., Wilmington, Delaware). This solution was then applied to the body of each anesthetized insect. Other flies were fed a freshly prepared quantity of sugar syrup containing the indicated concentration of ethyl [bis-(ethylenimido)phosphoro] carbamate daily for five days (plural oral) or for one day (single oral).

On the eighth day following both oral and topical treatments, females were given the opportunity to lay eggs which were subsequently observed for hatching. The treatment manifested itself in a failure of oviposition in many of the females and where oviposition did occur, a failure of eggs to hatch.

The results of the treatment, indicating oviposition and hatching results, expressed as percentages of controls, were as follows:

| Treatment | Percent Concentration | Both Sexes | | Males | Females | |
|---|---|---|---|---|---|---|
| | | Oviposition | Hatch | Hatch | Oviposition | Hatch |
| Topical | 10 | 7 | 0 | 80 | 87 | 91 |
| Plural Oral | 0.005 | 36 | 0 | | | |
| Single Oral | 1 | | | | 11 | 0 |
| | 0.5 | | | | 40 | 65 |
| | 0.1 | 73 | 0 | 0 | | |
| | 0.05 | 45 | 26 | | | |

From the foregoing, it is seen that antifertility effects are obtained when adult screw worm flies are treated with ethyl [bis-(ethylenimido)phosphoro] carbamate. Topically, the carbamate at the concentration reported, achieved the most effective sterilization when both sexes were treated. In all cases, survival was good to excellent.

Orally, the compound obtained effective sterilization when both sexes were treated and when only one sex was treated. It was further noted that treated flies induced sterility into untreated flies of either sex. Survival of orally treated flies was good to excellent.

*Example VIII*

Adult screw worm flies of less than 24 hours old were treated both topically and orally with benzyl [bis-(ethylenimido)phosphoro] carbamate. The protocol followed was identical to that described in Example VII.

The treatment manifested itself in a failure of oviposition in many of the females and, when oviposition did occur, in a failure of the eggs to hatch.

The results of the treatment, indicating oviposition and hatching results, expressed as percentages of controls, were as follows:

| Treatment | Percent Concentration | Both Sexes | | Males | Females | |
|---|---|---|---|---|---|---|
| | | Oviposition | Hatch | Hatch | Oviposition | Hatch |
| Topical | 10 | | | | 0 | |
| | 6 | | | | 26 | 1 |
| | 2 | 25 | 0 | 0 | | |
| | 1 | 38 | 54 | 43 | | |
| Plural Oral | 0.05 | 87 | 0 | | | |
| | 0.01 | 100 | 1 | | | |
| Single Oral | 3 | | | 0 | 7 | 0 |
| | 2 | | | 1 | 56 | 78 |
| | 0.5 | 22 | 0 | | | |
| | 0.1 | 1 | 13 | | | |

Antifertility effects are obtained in both sexes when treated with benzyl [bis-(ethylenimido)phosphoro] carbamate, both topically and orally. Still further, benzyl [bis-(ethylenimido)phosphoro] carbamate is an effective sterilant even when only one sex was treated and then permitted to mate with an untreated individual of the opposite sex. Approximately five times as much material is required to topically sterilize females as is needed for males. In all cases, survival was good to excellent.

Orally, the compound sterilized screw worm flies which were treated both for one and for more than one day. Further, the treatment of flies of one sex which were then mated with untreated individuals resulted in the induction of sterility in either sex. Equal doses of benzyl [bis-(ethylenimido)phosphoro] carbamate resulted in sterility of both males and females.

*Example IX*

Chemically sterilized males were combined in various ratios of treated males: normal males: normal females. The hatchability of the eggs at the indicated concentration where the treated males had been treated with ethyl [bis-(ethylenimido)phosphoro] carbamate were as follows:

| Ratio | 1% | | 0.5% | |
|---|---|---|---|---|
| | Expected | Observed | Expected | Observed |
| 1:1:1 | 43 | 64 | 45 | 10 |
| 3:1:1 | 22 | 47 | 23 | 25 |
| 5:1:1 | 14 | 8 | 8 | 0 |

The treated males at all ratios were at least equally competitive with normal males at 0.5%. However, the indications at the 1% level were that the treated males competed successfully only when the normal males were overwhelmed. Simultaneous and similar tests with gamma irradiated males showed that these males competed more effectively than did those males treated with ethyl [bis-(ethylenimido)phosphoro] carbamate. The survival of the chemically treated males was poorer than that of untreated flies but was at least equal to that of the irradiated flies. As the ratio of treated to untreated males was increased, the survival increased and approached control levels.

*Example X*

100 untreated, 100 gamma irradiated and 100 ethyl [bis-(ethylenimido)phosphoro] carbamate treated males were each observed for mortality in separate cages. One-half of the flies which were untreated were dead by 4 to 5 days. One-half of the gamma irradiated flies were dead by 4 to 5 days. The 50% end point of the group treated with ethyl [bis-(ethylenimido)phosphoro] carbamate was reached after 10 days.

*Example XI*

To determine the permanence of sterility, males and females were each treated with 1% ethyl [bis-(ethylenimido)phosphoro] carbamate and were then mated with untreated flies and egged 7 to 10 days later. Eggs were laid as a result of these matings but all failed to hatch.

*Example XII*

Males treated with 1% ethyl [bis-(ethylenimido)phosphoro] carbamate were combined with new groups of virgin females daily in a ratio of 1:10 until all males were dead on the 8th day. None of the eggs laid hatched.

*Example XIII*

Males and females of 0 to 1, 3 to 4, and 6 to 7 days old were each treated with 1% ethyl [bis(ethylenimido)phosphoro] carbamate and mated with untreated individuals. The flies were readily sterilized at all ages except that one egg out of 4,800 hatched in the mating of 3 to 4 day old treated males crossed with untreated females.

Example XIV

Compounds of the present invention were compared with known alkylating carbamate compound, namely, ethyl [bis-(2,2-dimethyl ethylenimino)phosphoro] carbamate to determine if this alkylating characteristic reflected chemosterilant properties. Ethyl [bis-(ethylenimino)phosphoro] carbamate and benzyl [bis-(ethylenimino)phosphoro] carbamate were selected to exemplify the present invention.

Ethyl [bis-(ethylenimino)phosphoro] carbamate prevented all egg laying when fed to adult house flies at a concentration of 1%. Benzyl [bis-(ethylenimino)phosphoro] carbamate, when fed to house flies on a 1% concentration permitted normal oviposition but none of the eggs hatched. On the other hand, the ethyl [bis(2,2-dimethyl ethylenimino)phosphoro] carbamate when fed to the house flies, had little or no effect. Results of this tests are recorded in the table below in which the compounds are respectively identified as *a, b, c*:

| Compound | Percent Egg Hatch | Pupal Development Number |
|---|---|---|
| (a) | No oviposition | |
| (b) | 0 | 0 |
| (c) | 99 | 75 |

From this it may be concluded that alkylating characteristics do not reflect chemosterilant properties.

Example XV

The procedure followed in testing with house flies comprises treating granulated sugar with a 1% solution of the compound to be tested. The sugar is then allowed to dry, repulverized and placed in emergence cages containing 100 newly emerged adult flies. Cages containing untreated food are used as checks. After three days, a dish containing untreated fly food consisting of 6 parts of sugar, 6 parts of powdered non-fat dry milk, and 1 part of powdered egg is added to the cages of flies. Five to 7 days later, one-half inch of wet NAIDM medium in a souffle cup is placed in the cage for oviposition. The same afternoon all egg masses are removed and placed in water to break up the egg masses into individual eggs. The eggs from all egg masses are mixed thoroughly and a random sample of 100 eggs is placed on a small piece of wet black cloth which is placed on a moist larval medium in a rearing container. After three days the eggs are examined and the percent hatch is determined. The larvae that hatch, crawl from the cloth into the rearing medium, and five days after oviposition the number of pupae are counted to determine the number of larvae that reach the pupal development. Ethyl [bis-(ethylenimino)phosphoro] carbamate (indicated as compound "A") and benzyl [bis-(ethylenimino)phosphoro] carbamate (indicated as compound "B") were selected to typify the compounds of the present invention. While previous tests had shown that a 1% concentration of both of these compounds in granulated sugar would induce sterility in house flies, these additional tests were conducted with various concentrations of the compounds in sugar and fly food to determine the level at which complete sterility could be obtained without causing excessive mortality.

The procedure comprised taking granulated sugar and our regular fly food (consisting of 6 parts of sugar, 6 parts of powdered non-fat dry milk and 1 part of powdered egg) containing 1% of the test compound and treating it with a solution or suspension of the test compound and a volatile solvent allowing the solvent to evaporate. The sugar or fly food is then dried, repulverized and placed in emergence cases containing 100 newly emerged adult flies. Cages containing untreated food were used as checks. After three days a dish containing untreated food was added to the cages of flies. Five to seven days later one-half inch of wet NAIDM medium in souffle cup is placed in the cage for oviposition. The same afternoon all egg masses are removed and placed in water to break up the egg masses into individual eggs. The eggs from all egg masses were then mixed thoroughly and a random sample of 100 eggs was placed on a small piece of wet black cloth which is placed on a moist larval medium in a rearing container. After three days the eggs were examined and the percent hatched determined. The larvae that hatched crawled from the cloth into the rearing medium and 5 days after oviposition the pupae are counted to determine the number of larvae that reach the pupal stage of development.

Complete sterility, as indicated by the failure of any progeny to reach the pupal stage of development, was produced by ethyl [bis-(ethylenimino)phosphoro] carbamate at concentrations as low as 0.05% in sugar and in fly food and by benzyl [bis-(ethylenimino)phosphoro] carbamate at concentrations of between 0.5% and 0.05% in sugar, and 0.25% in fly food. At 2.5% in sugar benzyl [bis-(ethylenimino)phosphoro] carbamate prevented oviposition. The results are reported in the table below.

| Test Compound | Percent Concentration | Egg Hatch (percent) | | Number of pupae | |
|---|---|---|---|---|---|
| | | Sugar | Fly Food | Sugar | Fly Food |
| "A" | 1 | 90 | (¹) | 0 | |
| | 0.5 | 10 | 0 | 0 | 0 |
| | 0.25 | 3 | 0 | 0 | 0 |
| | 0.1 | 3 | 5 | 0 | 0 |
| | 0.05 | 0 | 0 | 0 | 0 |
| | 0.025 | 88 | 90 | 0 | 79 |
| | 0.01 | 89 | 98 | 31 | 91 |
| Check ² | | 95–100 | 85–99 | 82–97 | 82–87 |
| "B" | 2.5 | (¹) | | 0 | |
| | 0.5 | 0 | | 0 | |
| | 0.25 | 0, 42 | 87 | 0, 0 | 0 |
| | 0.1 | 0 | | 0 | |
| | 0.05 | 0, 22 | 98 | 0, 0 | 13 |
| | 0.025 | 6 | 89 | 4 | 65 |
| | 0.01 | 22 | 95 | 19 | 77 |
| Check ² | | 96–99 | 85 | 81–82 | 82 |

¹ No oviposition.
² Range in two or more tests.

Example XVI

Ethyl[bis(ethylenimido)phosphoro] carbamate (indicated as compound A) and benzyl [bis(ethylenimido)phosphoro]carbamate (indicated as compound B) were evaluated to determine whether they affected one or both sexes. In making this determination, newly emerged males and females were segregated before mating, fed for five days on regular fly food treated with the test compound, and then crossed with virgin flies of the opposite sex that have been fed treated or untreated food. All of the flies were maintained on untreated fly food after mating. Ten insects of each sex were used in each test. On the 7th, 14th and 21st days, oviposition medium was made available. All of the egg masses obtained in any one cage were removed, placed in water and mixed and a random sample of 100 eggs was placed on dampened black cloth patches. The patches were then placed on house fly rearing medium and 48 hours later the eggs were inspected for hatch. Containers were held until the larvae had pupated at which time the pupae were counted. As will be shown from the data reproduced below the ethyl carbamate caused complete sterility of the females and almost complete sterility of the males at a concentration of 0.5%. The benzyl carbamate caused a high mortality, but incomplete sterility of either sex of a concentration of 1%. Results of these tests are reproduced below.

| Test Compound | Percent Concentration | Sex Treated | Percent Mortality of Treated Sex | Percent Fertility of Eggs and Viability of Progeny ||||||
|---|---|---|---|---|---|---|---|---|---|
| | | | | 1st egging || 2d egging || 3d egging ||
| | | | | Hatch | Pupation | Hatch | Pupation | Hatch | Pupation |
| A | 0.5 | F | 72 | 32<br>3 | 0<br>0 | 5<br>(¹) | 0 | (¹)<br>(¹) | |
| | | M | 48 | 70<br>3 | 0<br>1 | 2<br>0 | 0 | (¹)<br>(¹) | |
| | | Both | | 3 | 0 | (¹) | | (¹) | |
| B | 1 | F | 90 | 40<br>(¹) | 40 | (¹) | | (¹) | |
| | | M | 94 | 0<br>2 | 0 | 5<br>11 | 0<br>2 | 3<br>0 | 0 |

¹ Signifies no oviposition.

Example XVII

Ethyl [bis(ethylenimido)phosphoro]carbamate and benzyl [bis(ethylenimido)phosphor]carbamate were selected to typify the compounds of the present invention and were tested as sterilants of mosquitoes when administered in the larval stage. *Aedes aegypti* larvae were exposed to 10 to 15 parts per million of the test compounds in the rearing medium (water) on the third instar until adult emerges. Food was added during the first day of treatment. Up to 50 pairs of treated adults were held in the emergence cage for 3–5 days, then blood fed, and egg enmasse two days later. The total number of eggs was estimated and a sub-sample was used to determine hatchability. In the tests with the ethyl carbamate, the compound did not cause complete sterility although the percent hatch of eggs laid by adults reared from the larvae was 7% and 15 parts per million and 13% at ten parts per million. The benzyl carbamate caused little sterility at ten parts per million and the hatch was 52%.

From the foregoing it becomes apparent that a new and unexpected use has been found for the ethylenimido phosphoro carbamates of the present invention. It is of course understood that the compounds herein described are illustrative of the total concept and that while the treatment of screw worm and house flies have been almost exclusively utilized in this presentation for descriptive purposes, it is within the purview of the art to anticipate that other insects will be affected by these compounds and successfully treated therewith. It is also understood that such other modifications and applications of the present disclosure may occur to one skilled in the art confronted with the subject matter herein are intended to be included within the spirit of the present invention especially as it is defined by the scope of the claims appended hereto.

What is claimed is:

1. The method of treating an insect to render it substantially incapable of reproduction comprising administering to said insect a compound having the formula

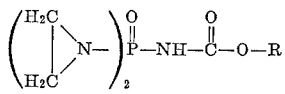

wherein R is selected from the group consisting of methyl, ethyl, benzyl and nitrobenzyl.

2. The method of claim 1 in which said compound is administered by the topical application of said compound to the body of said insect.

3. The method of claim 1 in which said compound is administered by the oral administration of said compound to the body of said insect.

4. The method of claim 3 in which said oral administration is effected by feeding said compound in the food of said insect to said insect.

5. A composition of matter for rendering an insect incapable of effective reproduction comprising a non-sterilizing insect food and at least 0.05% up to about 2.5%, by weight, of at least one compound selected from the group consisting of ethyl [bis(ethylenimido) phosphoro] carbamate, methyl [bis(ethylenimido)phosphoro] carbamate, benzyl [bis(ethylenimido)phosphoro] carbamate, and nitrobenzyl [bis(ethylenimido)phosphoro] carbamate.

6. A composition according to claim 5 in which said non-sterilizing insect food is selected from the group consisting of sugar and sugar syrup.

7. A composition according to claim 5 in which said non-sterilizing insect food is fly food.

8. A composition of matter for rendering an insect incapable of effective reproduction comprising polyalkylene ethers of fatty acid esters of sorbitol and, as its essential active ingredient, a small but effective amount of a compound having the formula

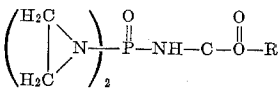

wherein R is selected from the group consisting of methyl, ethyl, benzyl and nitrobenzyl.

9. A composition of matter according to claim 8 in which said compound is benzyl [bis(ethylenimido)phosphoro] carbamate.

10. A composition of matter according to claim 8 in which said compound is ethyl [bis(ethylenimido)phosphoro] carbamate.

11. A composition of matter for rendering insects incapable of effective sexual reproduction comprising a solvent consisting of polyoxyalkylene ethers of fatty acid esters of sorbitol and at least about 0.05% up to about 2.5% by weight of a compound selected from the group consisting of ethyl [bis-(ethylenimido)phosphoro] carbamate, methyl [bis-(ethylenimido)phosphoro] carbamate, benzyl [bis-(ethylenimido)phosphoro] carbamate, and nitrobenzyl [bis-(ethylenimido)phosphoro] carbamate.

12. A composition of matter for rendering an insect incapable of effective reproduction comprising insect dusting powder and, as its essential active ingredient, a small but effective amount of a compound having the formula

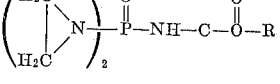

wherein R is selected from the group consisting of methyl, ethyl, benzyl and nitrobenzyl.

13. A composition of matter according to claim 12 in which said compound is benzyl [bis(ethylenimido)phosphoro] carbamate.

14. A composition of matter according to claim 12 in which said compound is ethyl [bis(ethylenimido)phosphoro] carbamate.

15. A composition of matter for rendering an insect incapable of effective reproduction comprising insect food and, as its essential active ingredient, a small but effective amount of a compound having the formula

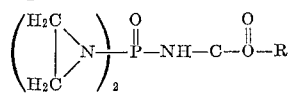

wherein R is selected from the group consisting of methyl, ethyl, benzyl and nitrobenzyl.

16. A composition of matter according to claim 15 in which said compound is benzyl [bis(ethylenimido)phosphoro] carbamate.

17. A composition of matter according to claim 15 in which said compound is ethyl [bis(ethylenimido)phosphoro] carbamate.

18. A composition of matter for rendering an insect incapable of effective reproduction comprising sugar and, as its essential active ingredient, a small but effective amount of a compound having the formula

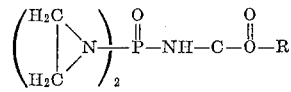

wherein R is selected from the group consisting of methyl, ethyl, benzyl and nitrobenzyl.

19. A composition of matter according to claim 18 in which said compound is benzyl [bis(ethylenimido)phosphoro] carbamate.

20. A composition of matter according to claim 18 in which said compound is benzyl [bis(ethylenimido)phosphoro] carbamate.

21. A composition of matter, according to claim 18 in which said sugar is in the form of sugar syrup.

References Cited by the Examiner

Bardos et al.: Nature, vol. 183, No. 4658, pp. 399–400, Feb. 7, 1959.

Borkovec: Science, vol. 137, pp. 1034–1036, September 1962.

La Brecque: Journal of Economic Entomology, vol. 54, No. 4, pp. 684–689, August 1961.

LEWIS GOTTS, *Primary Examiner.*

RICHARD L. HUFF, *Assistant Examiner.*